United States Patent [19]

Carasso

[11] Patent Number: 5,627,918
[45] Date of Patent: May 6, 1997

[54] PROCEDURE FOR DIGITAL IMAGE RESTORATION

[75] Inventor: Alfred S. Carasso, North Potomac, Md.

[73] Assignee: The United States of America as represented by the Secretary of Commerce, Washington, D.C.

[21] Appl. No.: 151,616

[22] Filed: Nov. 12, 1993

Related U.S. Application Data

[63] Continuation-in-part of Ser. No. 991,105, Dec. 16, 1992, Pat. No. 5,414,782.

[51] Int. Cl.$^6$ .................................................. G06K 9/40
[52] U.S. Cl. ................................... 382/254; 382/131
[58] Field of Search ......................... 382/54, 6, 41, 382/43; 282/254, 255, 275, 131, 132, 280

[56] References Cited

U.S. PATENT DOCUMENTS

| | | | |
|---|---|---|---|
| 4,315,318 | 2/1982 | Kato et al. | 364/413.13 |
| 4,329,588 | 5/1982 | Barrett et al. | 364/416 |
| 4,331,877 | 5/1982 | Barrett et al. | 364/416 |
| 4,633,504 | 12/1986 | Wihl | 382/54 |
| 4,758,304 | 7/1988 | McNeil et al. | 156/626 |
| 4,877,479 | 10/1989 | McNeil et al. | 156/626 |
| 4,903,205 | 2/1990 | Hishinuma | 364/413.13 |
| 4,907,156 | 3/1990 | Doi et al. | 364/413.13 |
| 4,947,323 | 8/1990 | Smith | 364/413.13 |
| 5,047,968 | 9/1991 | Carrington et al. | 382/54 |

OTHER PUBLICATIONS

R. Barden et al., "High Resolution MS–Type Saticon Pick–Up Tube with Optimized Electron Optical Properties," *Electron Image Tubes and Image Intensifiers II, SPIE*, 1449, (1991), 136–147.

A.S. Carasso et al., "Digital Removal of Random Media Image Degradations By Solving the Diffusion Equation Backwards in Time," *SIAM Journal on Numerical Analysis*, 15 (1978), 344–367.

K.A. Costello et al., "Imaging GaAs Vacuum Photodiode with 40% Quantum Efficiency at 530 nm," *Electron Image Tubes and Image Intensifiers, SPIE*, 1243, (1990) 99–106.

H. Fujita et al., "A Simple Method for Determining the Modulation Transfer Function in Digital Radiography," *IEEE Transactions on Medical Imaging*, 11 (1992), 34–39.

J.D. Gonglewski et al., "Laboratory and Field Results in Low Light Postdetection Turbulence Compensation Using Self Referenced Speckle Holography," *Digital Image Synthesis and Inverse Optics, SPIE*, 1351 (1990), 798–806.

Y. Higashida et al., "Dual–Film Cassette Technique for Studying the Effect of Radiographic Image Quality on Diagnostic Accuracy," *Medical Physics*, 11 (1984), 646–652.

(List continued on next page.)

*Primary Examiner*—Joseph Mancuso
*Attorney, Agent, or Firm*—Reed Smith Shaw & McClay

[57] ABSTRACT

The image restoration system and method of the present invention is applied to point spread functions $p(x,y)$ which may be described in the Fourier domain as $\hat{p}(\xi,\eta)=\exp\{-\Sigma^j_{i=1}\lambda_i(\xi^2+\eta^2)^{\beta_i}\}\lambda_i\geq 0$, $0<\beta_i<1$, to improve noise performance and permit identification of fine detail. The novel method formulates the image restoration problem as a problem in the partial differential equations describing diffusion phenomena using a new type of a priori constraint. The restored image is obtained by minimizing a quadratic functional incorporating this new constraint. The solution of the minimization problem may be obtained directly by means of fast Fourier transform algorithms. The restoration method may be performed as a sequence of partial restorations as $t\downarrow 0$ wherein the partial restorations become sharper and noisier as $t\downarrow 0$, or as a single full restoration. The sequence of partial restorations may reveal features of the image before such features become obscured by noise and may permit adjustment of the parameters characterizing the blurring functions and constraints.

7 Claims, 3 Drawing Sheets

OTHER PUBLICATIONS

C.B. Johnson, "A Method for Characterizing Electro–Optical Device Modulation Transfer Functions," *Photographic Science and Engineering*, 14 (1970), 413–415.

C.B. Johnson, "Classification of Electron–Optical Device Modulation Transfer Functions," *Advances in Electronics and Electron Physics*, 33B (1972), 579–584.

C.B. Johnson et al., "High Resolution Microchannel Plate Image Tube Development," *Electron Image Tubes and Image Intensifiers II, SPIE*, 1449 (1991), 2–12.

N.S. Kopeika, "Spectral Characteristics of Image Quality for Imaging Horizontally Through the Atmosphere," *Applied Optics*, 16 (1977), 2422–2426.

N.S. Kopeika, "Imaging Through the Atmosphere for Airborne Reconnaissance," *Optical Engineering*, 26 (1987), 1146–1154.

H. Kuhn et al., "Imaging Characteristics of Different Mammographic Screens," *Medical Physics*, 19 (1992), 449–457.

S.M. Mohapatra et al., "Transfer Function Measurement and Analysis for a Magnetic Resonance Imager," *Medical Physics*, 18 (1991), 1141–1144.

E.L. Nickoloff et al., "A Simplified Approach for Modulation Transfer Function Determinations in Computed Tomography," *Medical Physics*, 12 (1985), 437–442.

P.J. Papin et al., "A Prototype Amorphous Selenium Imaging Plate System for Digital Radiography," *Medical Physics*, 14 (1987), 322–329.

B.C. Penney et al., "Constrained Least–Squares Restoration of Nuclear Medicine Images: Selecting the Coarseness Function," *Medical Physics*, 14 (1987), 849–858.

B.C. Penney et al., "Relative Importance of the Error Sources in Wiener Restoration of Scintigrams," *IEEE Transactions on Medical Imaging*, 9 (1990), 60–70.

K.S. Pentlow et al., "Quantitative Imaging of 1–124 Using Positron Emission Tomography with Applications to Radioimmunodiagnosis and Radioimmunotherapy," *Medical Physics*, 18 (1991), 357–366.

U. Raff et al., "Improvement of Lesion Detection in Scintigraphic Images by SVD Techniques for Resolution Recovery," *IEEE Transactions on Medical Imaging*, MI–5 (1986), 35–44.

N.V. Rao, "Development of High Resolution Camera Tube for 2000 Line TV System," *Electron Image Tubes and Image Intensifiers, SPIE*, 1243 (1990), 81–86.

S. Rudin et al., "Improving Fluoroscopic Image Quality with Continuously Variable Zoom Magnification," *Medical Physics*, 18 (1991), 972–977.

S. Sanada et al., "Comparison of Imaging Properties of a Computed Radiography System and Screen–Film Systems," *Medical Physics*, 18 (1991), 414–420.

M. Takahashi et al., "Digital TV Tomography: Description and Physical Assessment," *Medical Physics*, 17 (1990), 681–685.

F.C. Wagner et al., "A Characterization of the Scatter Point–Spread–Function in Terms of Air Gaps," *IEEE Transactions on Medical Imaging*, 7 (1988), 337–344.

S. Webb et al., "Constrained Deconvolution of SPECT Liver Tomograms by Direct Digital Image Restoration," *Medical Physics*, 12 (1985), 53–58.

R. Weber, "The Ground–Based Electro–Optical Detection of Deep–Space Satellites," *Applications of Electronic Imaging Systems, SPIE*, 143 (1978), 59–69.

F.F. Yin et al., "Measurement of the Presampling Modulation Transfer Function of Film Digitizers Using a Curve Fitting Technique," *Medical Physics*, 17 (1990), 962–966.

H.T. Yura, "Imaging in Clear Ocean Water," *Applied Optics*, 12 (1973), 1061–1066.

A.S. Carasso, "Image Restoration and Diffusion Processes" *Proceedings of the SPIE*, 2035 (1993).

A.S. Carasso, "Overcoming Hölder Continuity in III–Posed Continuation Problems," *SIAM Journal on Numerical Analysis*.

PROCEDURE FOR DIGITAL IMAGE RESTORATION

CROSS-REFERENCE TO RELATED APPLICATION

This is a continuation-in-part of U.S. patent application Ser. No. 07/991,105, filed Dec. 16, 1992, now U.S. Pat. No. 5,414,782.

FIELD OF THE INVENTION

The present invention relates to image processing, and, in particular, to image restoration.

BACKGROUND OF THE INVENTION

Comprehensive coverage of prior art in the field of image restoration relevant to the system and method may be found in H. C. Andrews and B. R. Hunt, *Digital Image Restoration*, Prentice-Hall Signal Processing Series, Prentice-Hall, Inc., Englewood Cliffs, N.J. (1977); W. K. Pratt, *Digital Image Processing*, 2nd Edition, John Wiley and Sons, NY (1988); H. Stark, *Image Recovery, Theory and Application*, Academic Press, Inc., Harcourt Brace Jovanovich, Publishers, New York (1987); R. C. Gonzalez and P. Wintz, *Digital Image Processing*, 2nd Edition, Addison-Wesley Publishing Company, Inc., Advanced Book Program, Reading, Mass. (1987); and R. L. Lagendijk and J. Biemond, *Iterative Identification and Restoration of Images*, Kluwer International Series in Engineering and Computer Science, Kluwer Academic Publishers, Boston, Mass. (1991). For space-invariant blurs, digital image restoration is associated with the solution of two dimensional ill-posed convolution integral equations of the form $$g(x,y) = \int_{-\infty}^{\infty}\int_{-\infty}^{\infty} p(x-u,y-v)f(u,v)dudv, \quad \text{Equation (1)}$$

where $g(x,y)$ is the degraded image, $f(x,y)$ is the desired ideal image, and $p(x,y)$ is the known point spread function of the imaging system. The point spread function acts to blur or smooth out the ideal image, making it impossible to distinguish fine details in the recorded image $g(x,y)$. Separately, $g(x,y)$ is further contaminated by measurement noise. Thus:

$$g(x,y) = g_e(x,y) + n(x,y), \quad \text{Equation (2)}$$

where $g_e(x,y)$ is the blurred image that would have been recorded in the absence of noise, and $n(x,y)$ represents the cumulative effects of all noise processes affecting final acquisition of the digitized array $g(x,y)$. This includes the case of multiplicative noise, where $n(x,y)$ is a function of $f(x,y)$. The noise component $n(x,y)$ is unknown but may be presumed small. Likewise, $g_e(x,y)$ is unknown. The type and intensity of the blurring caused by p, together with the magnitude of the noise in g, ultimately limit the quality of the restoration that can be achieved. It is convenient to write Equation (1) in operation notation as:

$$Pf = g \quad \text{Equation (3)}$$

where P is the integral operation in $L^2(R^2)$ with kernel $p(x-u, y-v)$.

The two dimensional Fourier transform plays a major role in the subsequent analysis. For a function $a(x,y)$ of the space variables x,y, the Fourier transform $\hat{a}(\xi,\eta)$ may be expressed as:

$$\hat{a}(\xi,\eta) = \int_{-\infty}^{\infty}\int_{-\infty}^{\infty} a(x,y)e^{-2\pi i(\xi x+\eta y)}dxdy. \quad \text{Equation (4)}$$

The Fourier transform of the point spread function is called the optical transfer function and is an important tool in image analysis. The convolution theorem states that the transform of a convolution is the product of the individual transforms. The Parseval theorem states that the $L^2$ scalar product of two functions in the space variables x,y is equal to their scalar product in the transform variables $\xi,\eta$. These and other results from Fourier analysis in $L^2$ are well known in the art. For convolution equations such as Equation (1), it is advantageous to perform the analysis and computations in the Fourier domain. After image processing, the inverse Fourier transform is used to return to the space variables x,y.

The class G of point spread functions, described by Equation (5A) below, plays a key role in several civilian and military applications, including biomedical imaging; night vision systems; undersea imaging; imaging through the atmosphere; remote sensing; high definition television; and industrial applications. Consider first the class of point spread functions $p(x,y)$ described as follows in the Fourier transform domain:

$$\hat{p}(\xi,\eta) = e^{-\lambda(\xi^2+\eta^2)\beta}, \lambda>0, 0<\beta\leq 1. \quad \text{Equation (5)}$$

The case $\beta=1$ corresponds to a Gaussian point spread function. This case occurs in quite diverse applications, including undersea imaging (see H. T. Yura, 'Imaging in Clear Ocean Water,' *Applied Optics*, Vol. 12 (1973), pp. 1061–1066); low light-level electro-optical detection (see R. Weber, 'The Ground-Based Electro-Optical Detection of Deep-Space Satellites,' *Applications of Electronic Imaging Systems*, Proceedings of the Society of Photo-Optical Instrumentation Engineers, Vol. 143, R. E. Franseen and D. K. Schroder, Eds. (1978), pp. 59–69); nuclear medicine gamma camera scintigrams (see S. Webbet al., 'Constrained Deconvolution of SPECT Liver Tomograms by Direct Digital Image Restoration,' *Medical Physics*, Vol. 12 (1985), pp. 53–58; U. Raff et al., 'Improvement of Lesion Detection in Scintigraphic Images by SVD Techniques for Resolution Recovery,' *IEEE Transactions on Medical Imaging*, Vol. MI-5 (1986), pp. 35–44; B. C. Penney et al., 'Constrained Least Squares Restoration of Nuclear Medicine Images; Selecting the Coarseness Function,' *Medical Physics*, Vol. 14 (1987), pp. 849–859; B. C. Penney et al., 'Relative Importance of the Error Sources in Wiener Restoration of Scintigrams,' *IEEE Transactions on Medical Imaging*, Vol. 9 (1990), pp. 60–70; K. S. Pentlow et al., 'Quantitative Imaging of 1–124 Using Positron Emission Tomography with Applications to Radioimmunodiagnosis and Radioimmunotheray,' *Medical Physics*, Vol. 18 (1991), pp. 357–366); magnetic resonance imaging (see S. M. Mohapatra et al., 'Transfer Function Measurement and Analysis for a Magnetic Resonance Imager,' *Medical Physics*, Vol. 18 (1991), pp. 1141–1144); and computed tomography scanners (see E. L. Nickoloff and R. Riley, 'A Simplified Approach for Modulation Transfer Function Determinations in Computed Tomography,' *Medical Physics*, Vol. 12 (1985), pp. 437–442).

The case $\beta=5/6$ describes blurring caused by atmospheric turbulence under long time exposure. This optical transfer function is important in post processing of degraded images obtained in airborne reconnaissance, in remote sensing from environmental or surveillance satellites, in the detection of deep-space satellites from ground-based telescopes, and in observational astronomy (see J. C. Wyant, Ed. *Imaging Through the Atmosphere,* Proceedings of the Society of Photo-Optical Instrumentation Engineers, Vol. 75 (1976); N. S. Kopeika, 'Spectral Characteristics of Image Quality for Imaging Horizontally Through the Atmosphere,' *Applied Optics,* Vol. 16 (1977), pp. 2422–2426; R. Weber, 'The Ground-Based Electro-Optical Detection of Deep-Space Satellites,' *Applications of Electronic Imagining Systems,* Proceedings of the Society of Photo-Optical Instrumentation Engineers, Vol. 143, R. E. Franseen and D. K. Schroder, Eds. (1978), pp. 59–69 N. S. Kopeika, 'Imaging Through the Atmosphere for Airborne Reconnaissance,' *Optical Engineering,* Vol. 26 (1987), pp. 1146–1154; J. D. Gonglewski and D. G. Voelz, 'Laboratory and Field Results in Low Light Post-detection Turbulence Compensation Using Self Referenced Speckle Holography,' *Digital Image Synthesis and Inverse Optics,* Proceedings of the Society of Photo-Optical Instrumentation Engineers, Vol. 1351, A. F. Gmitro, P. S. Idell, and I. J. LaHaie, Eds. (1990), pp. 798–806.

The case $\beta=1/2$ corresponds to the Cauchy or Lorentzian density, and may be used to describe X-ray scattering in radiology (see F. C. Wagner et al., 'A Characterization of the Scatter Point Spread Function in Terms of Air Gaps,' *IEEE Transactions on Medical Imaging,* Vol. 7 (1988), pp. 337–344).

A wide variety of electron-optical devices obey Equation (5) with a value of B satisfying $\tfrac{1}{2} \leq \beta \leq 1$ (see C. B. Johnson, 'A Method for Characterizing Electro-Optical Device Modulation Transfer Functions,' *Photographic Science and Engineering,* Vol. 14 (1970), pp. 413–415; C. B. Johnson, 'Classification of Electron-Optical Device Modulation Transfer Function,' *Advances in Electronics and Electron Physics,* Vol. 33B (1972), pp. 579–584; C. B. Johnson et al., 'High-Resolution Microchannel Plate Image Tube Development,' *Electron Image Tubes and Image Intensifiers II,* Proceedings of the Society of Photo-Optical Instrumentation Engineers, Vol. 1449, I. P. Csorba, Ed. (1991), pp. 2–12).

Such devices constitute important elements of various biomedical imaging modalities, including image intensifier-video camera (II-TV) fluoroscopic systems (see S. Rudin et al., 'Improving Fluoroscopic Image Quality with Continuously Variable Zoom Magnification,' *Medical Physics,* Vol. 19 (1991), pp. 972–977); radiographic film digitizers (see F. F. Yin et al., 'Measurement of the Presampling Transfer Function of Film Digitizers Using a Curve Fitting Technique,' *Medical Physics,* Vol. 17 (1990), pp. 962–966); radiographic selenium imaging plates (see P. J. Papin and H. K. Huang, 'A Prototype Amorphous Selenium Imaging Plate System for Digital Radiography,' *Medical Physics,* Vol. 14 (1987), pp. 322–329); computed radiography photostimulable phosphor systems (see S. Sanada et al., 'Comparison of Imaging Properties of a Computed Radiography System and Screen-Film Systems,' *Medical Physics,* Vol. 18 (1991), pp. 414–420; H. Fujita et al., 'A Simple Method for Determining the Modulation Transfer Function in Digital Radiography,' *IEEE Transactions on Medical Imaging,* Vol. 11 (1992), pp. 34–39); digital TV tomography systems (see M. Takahashi et al., 'Digital TV Tomography: Description and Physical Assessment,' *Medical Physics,* Vol. 17 (1990), pp. 681–685); and radiographic screen-film systems (see Y. Higashida et al., 'Dual-Film Cassette Technique for Studying the Effect of Radiographic Image Quality on Diagnostic Accuracy,' *Medical Physics,* Vol. 11 (1984), pp. 646–652; H. Kuhn and W. Knupfer, 'Imaging Characteristics of Different Mammographic Screens,' *Medical Physics,* Vol. 19 (1992), pp. 449–457).

Other important image tube/image intensifier applications include high definition television (HDTV) (see N. V. Rao, 'Development of a High-Resolution Camera Tube for 2000-Line TV System,' *Electron Tubes and Image Intensifiers,* Proceedings of the Society for Photo-Optical Instrumentation Engineers, Vol. 1243, I. P. Csorba, Ed. (1990), pp. 81–86; R. Barden et al., 'High Resolution MS-Type Saticon Pick-Up Tube with Optimized Electron-Optical Properties,' *Electron Tubes and Image Intensifiers II,* Proceedings of the Society for Photo-Optical Instrumentation Engineers, Vol. 1449, I. P. Csorba, Ed. (1991), pp. 136–147, and night vision and undersea imaging systems (see K. A. Costello et al., 'Imaging GaAs Vacuum PhotoDiode with 40% Quantum Efficiency at 530 nm,' *Electron Tubes and Image Intensifiers,* Proceedings of the Society for Photo-Optical Instrumentation Engineers, Vol. 1243, I. P. Csorba, Ed. (1990), pp. 99–106.

In a typical imaging situation, several electron-optical devices may be cascaded together and used to image objects through a distorting medium such as the atmosphere or the ocean. The overall optical transfer function is then the product of finitely many functions of the type given by Equation (5), i.e., $$\hat{p}(\xi,\eta) = e^{-\Sigma^J_{i=1}\lambda_i(\xi^2+\eta^2)^{\beta_i}}, \quad \lambda_i \geq 0, \ 0 < \beta_i \leq 1. \qquad \text{Equation (5A)}$$

Problems having optical transfer functions satisfying Equation (5A) may be referred to as space-invariant image restoration problems wherein the image restoration problem is equivalent to an ill-posed backwards in time continuation problem for a generalized differential equation. Each factor in this product represents a component of the total blur, and is described by Equation (5) with a particular value for $\lambda$ and $\beta$. A method for determining $\lambda_i$ and $\beta_i$ for each component is discussed in C. B. Johnson, 'Classification of Electron-Optical Device Modulation Transfer Function,' *Advances in Electronics and Electron Physics,* Vol. 33B (1972), pp. 579–584. Equation (5A) also describes cascaded electron-optical devices forming the imaging chain in many digital radiography systems. Frequency domain characterization of such systems is an important and ongoing task, as is evident from the above-cited references. In several industrial applications, the general functional form defined by Equation (5A) may be found to best-fit an empirically determined optical transfer function, by suitable choices of the parameters $\lambda_i$, $\beta_i$ and J.

It is emphasized that while many imaging phenomena do not have optical transfer functions that can be well-described by Equation (5A), the latter nevertheless encompasses a significant set of imaging problems. We denote by G the class of optical transfer functions defined by Equation (5A). Note that Equation (5) is a special case of Equation (5A). The functions in G are infinitely divisible probability density functions.

Most current approaches to image restoration are based on linear system inverse filter theory, where the input is the degraded image, and the single output is an approximation to the ideal image. Using a priori constraints on the unknown ideal image, various regularization methods are employed in these approaches, in order to stabilize the deconvolution procedure in the presence of noise. Tikhonov regularization is one of the best-known examples of such procedures. This method is closely related to Wiener filtering. The Tikhonov regularization method is also known as constrained least squares. In its simplest form, Tikhonov restoration is based on the following a priori information concerning the unknown ideal image f(x,y) in Equation (1), and the noise n(x,y) in the degraded image g(x,y):

$$\|f\| \leq M, \|n\| \leq \epsilon,\qquad\text{Equation (6)}$$

where $\|\ \|$ denotes the $L^2(R^2)$ norm. This leads to the following constrained restoration problem for Equation (3). Given $\epsilon$, M>0, with $\epsilon/M \ll 1$, find all $f \in L^2(R^2)$ such that $$\|Pf-g\| \leq \epsilon, \|f\| \leq M.\qquad\text{Equation (7)}$$

The a priori bound constraint on $\|f\|$ in Equation (6) prevents explosive growth of noise in the restoration process. However, that constraint is not strong enough to prevent substantial noise contamination from obscuring fine detail in the restored image.

It is known in the prior art that the problem of restoring continuous dependence on the data in non well-posed problems for partial differential equations wherein the image restoration problem is equivalent to an ill-posed backwards in time problem for a generalized diffusion equation, requires constraints of the solution. This was taught by F. John, *Continuous Dependence on Data for Solutions of Partial Differential Equations with a Prescribed Bound*, Comm. Pure Appl. Math., 13 (1960), pp. 551–585. An effective approach in many cases is to prescribe an a priori bound M on the solution, or on the solution and finitely many of its derivatives, in an appropriate norm.

In the known prior art numerous authors have contributed to the study of stability estimates for improperly posed problems, linear and nonlinear, in various norms.

However, from the standpoint of numerical computation of the solutions from observed data, such estimates are not entirely satisfactory.

In the method of the present invention, a supplementary constraint is developed. This method is the slow evolution from the continuation boundary constraint, or sec B.

The theory of the SECB constraint is developed in detail in the manuscript *Overcoming Holder Continuity in Ill-Posed Continuation Problems* by Alfred S. Carasso, which is attached to this application and is an integral part of this application. The theory is discussed in the context of partial differential equations, and specifically in Sections 4, 4.1, 4.2, and 4.2 of the manuscript, with regard to image restoration. The basic algorithmic implementation of the SECB method, based on the Fast Fourier Transform, along with controlled computational experiments demonstrating the superiority of the SECB method over prior art, are discussed in Sections 4.2 and 4.3.

A research paper based on an expanded version of the above-mentioned manuscript was authored by Alfred S. Carasso and published in the SIAM Journal on Numerical Analysis, Volume 31, No. 6, December 1994, pp. 1535–1557.

SUMMARY OF THE INVENTION

The invention is an image restoration method in a system wherein image degradation causes a degraded image g(x,y) of the form Pf=g where P is an integral operator upon the ideal image f(x,y), $w(x,y,0)P^{\alpha f}$ represents the ideal image at time t=0 prior to the operation of Pf, and w(x,y,1)=Pf=g represents the degraded image at time t=1. In this method the magnitude of the difference between the ideal image f and a blurred version of f is required to be less than a preassigned tolerance value. This requirement is implemented by constraining the magnitude of the difference $\|f-P^s f\|$ wherein $P^{sf}$ represents the image at time t=s and s is a substantially small value. The constraint $\|f-P^2 f\| \leq K\epsilon$, where K is a constant and $\epsilon$ is representative of at least one image restoration parameter is imposed. Another constraint imposed is $\|Pf-g\| \leq \epsilon$ wherein $\epsilon$ is representative of at least one image restoration parameter. The constraint $\|f\| \leq M$, wherein M>>E, is also imposed. The restored image is then determined by minimizing the quantity $\|Pf-g\|^2 + \|(\epsilon/M)f\|^2 \|(1/K)(f-P^s f)\|^2$.

BRIEF DESCRIPTION OF THE DRAWINGS

The foregoing summary, as well as the following detailed description of preferred embodiments of the invention, Will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
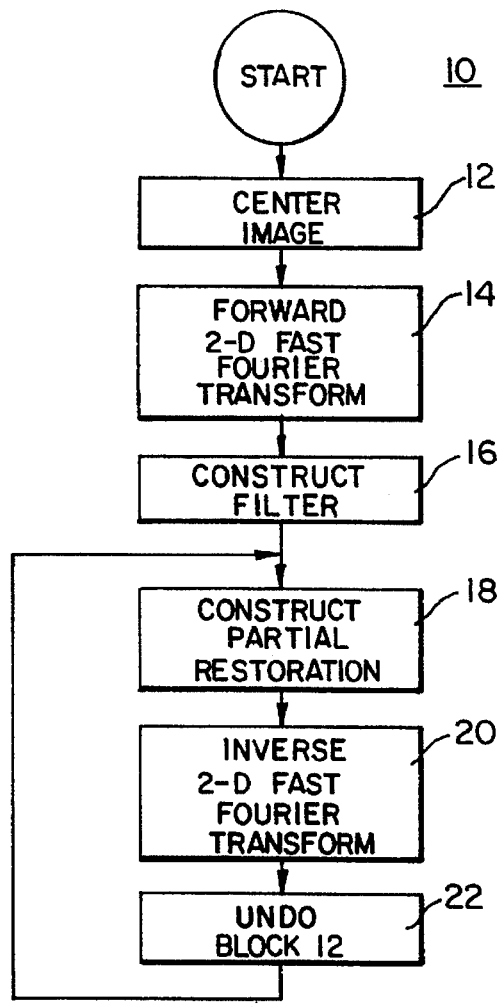
FIG. 1 shows a flow chart representation of the image restoration method of the present invention.

In the drawings, like numerals are used to indicate like elements throughout. Referring now to FIG. 1, a flow chart representation of image restoration method 10 of the present invention is shown. It will be understood that the particular form of the optical transfer function in Equation (5A) plays no role in Tikhonov restoration. Indeed, Tikhonov regularization may be applied to a much wider class of image restoration problems. However, the fact that point spread functions in class G are infinitely divisible probability density functions plays an essential role in image restoration method 10. The blurred image g(x,y) is now viewed as the end result of a diffusion process applied to the desired ideal image f(x,y). This follows by recognizing Equation (5A) as the causal fundamental solution for the following parabolic initial value problem for the function $w_i(x,y,t)$:

$$\frac{\partial w}{\partial t} = -\sum_{i=1}^{J} \gamma_i (-\Delta)^{\beta_i} w, \, t>0, \, x,y \in R^2 \qquad\text{Equation (14)}$$

$$w(x,y,0) = f(x,y).$$

In Equation (13), $\gamma_i = \lambda_i (4\pi^2)^{-\beta_i} > 0$, are the diffusion coefficients. If all $\beta_i = 1$, Equation (14) is the classical heat equation. For $0 < \beta_i < 1$, Equation (14) represents a generalized diffusion process. Fourier analysis of Equation (14) shows that if Equation (3) holds with the kernel of P satisfying Equation (5A), then the blurred noiseless image $g_e(x,y)$ is the solution of Equation (14) at t=1, $$g_e(x,y)=w(x,y,1) \quad \text{Equation (15)}$$

For any t with $0 \leq t \leq 1$, Fourier analysis may be used to define the fractional powers $P^t$ of the integral operator P when its kernel satisfies Equation (SA). The kernel of $P^t$ is the optical transfer function given by Equation (SA) with $\lambda_i$ replaced by $t\lambda_i$. Moreover, $P^tP^r=P^{t+r}$ for any $t, r \geq 0$ and $P^0=I$, where I is the identity operator on $L^2(R^2)$. The forward solution of Equation (14) is given by $w(x,y,t)=P^tf$. Consequently, for point spread functions in class G, image restoration is exactly equivalent to solving the partial differential equation problem in Equation (14) backwards in time, using the given degraded image g(x,y), rather than $g_e(x,y)$, as data at $t=1$. The desired ideal image is the corresponding solution at $t=0$.

$$f(x,y)=w(x,y,0) \quad \text{Equation (16)}$$

For any t with $0<t<1$, $w(x,y,t)$ constitutes a partial restoration, while $w(x,y,0)$ is the full restoration. In the absence of noise, with data $g_e(x,y)$ in place of g(x,y), w(x,y,t) closely approximates f(x,y), provided t is sufficiently small, the $\lambda_i$ are small, and f(x,y) is sufficiently well-behaved, i.e., high frequency components do not dominate the power spectrum of f(x,y). This is likely to be the case in the vast majority of images f(x,y) encountered in practical applications.

Thus, if $n(x,y)=0$ in Equation (2), then for some fixed small $s>0$, and a small constant $\delta$, the inequality $\|w(.,s)-f\| \leq \delta$, holds. When $n(x,y) \neq 0$, such an inequality is not true because spurious high frequency noise artifacts can seriously contaminate the restoration process as $t \downarrow 0$. However, in the presence of noise, such an inequality may be imposed as an additional constraint. In this case, noise artifacts in the restored image may be expected to be substantially reduced.

Since $\|n\| \leq \epsilon$, it is convenient to put $\delta = K\epsilon$ for some small constant $K>0$. With $w(x,y,s)=P^sf$, this new constraint may then be expressed as follows: For fixed small $s>0$ and small constant $K>0$, where both s and K are determined on the basis of a priori information, $$\|(I-P^2)f\| \leq K\epsilon \quad \text{Equation (17)}$$

This is the slow evolution from the continuation boundary constraint, as it applies in the context of image restoration.

Figure 2:
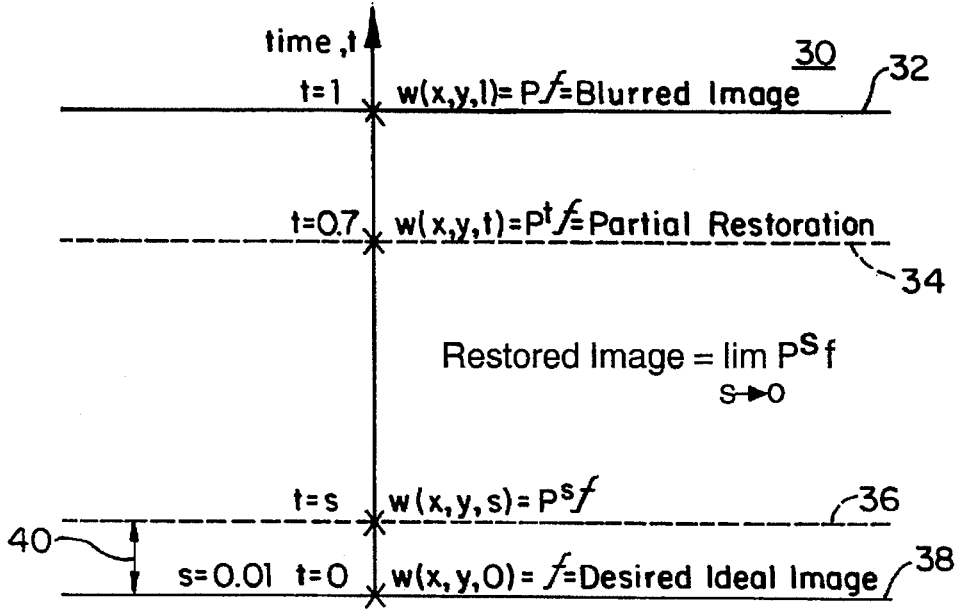
FIG. 2 shows a graphical description of the constraint of the invention.
Figure 4:
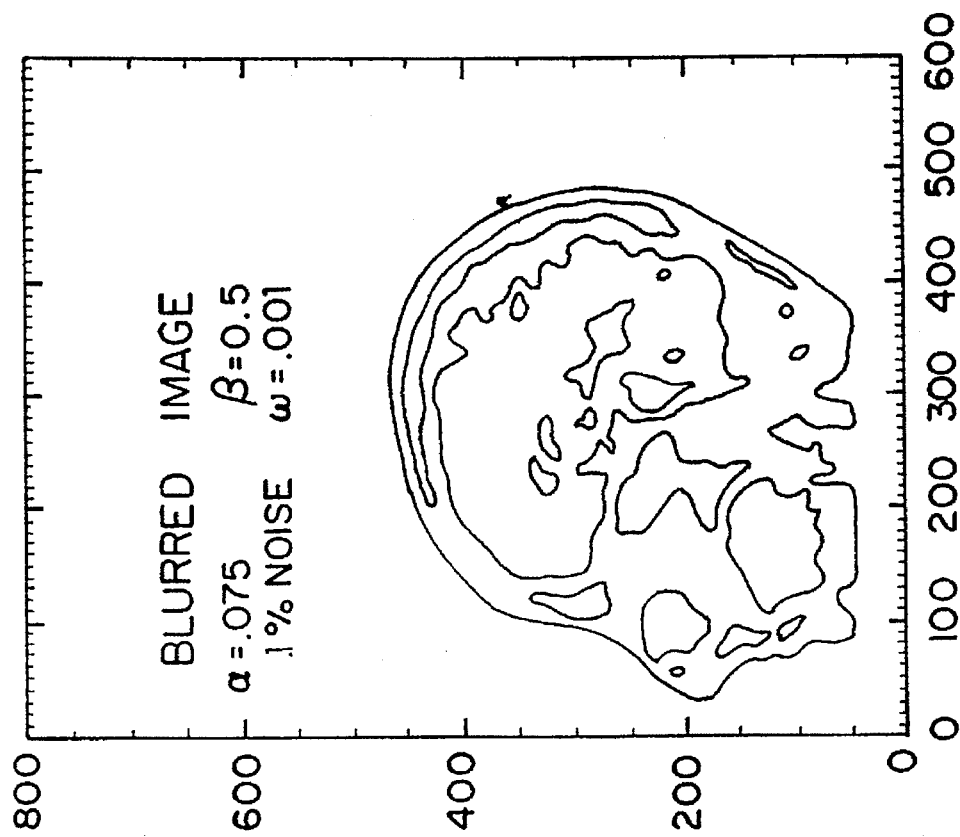
FIG. 4 shows a contour map representation of a blurred image corresponding to the original image of FIG. 3.
Figure 3:
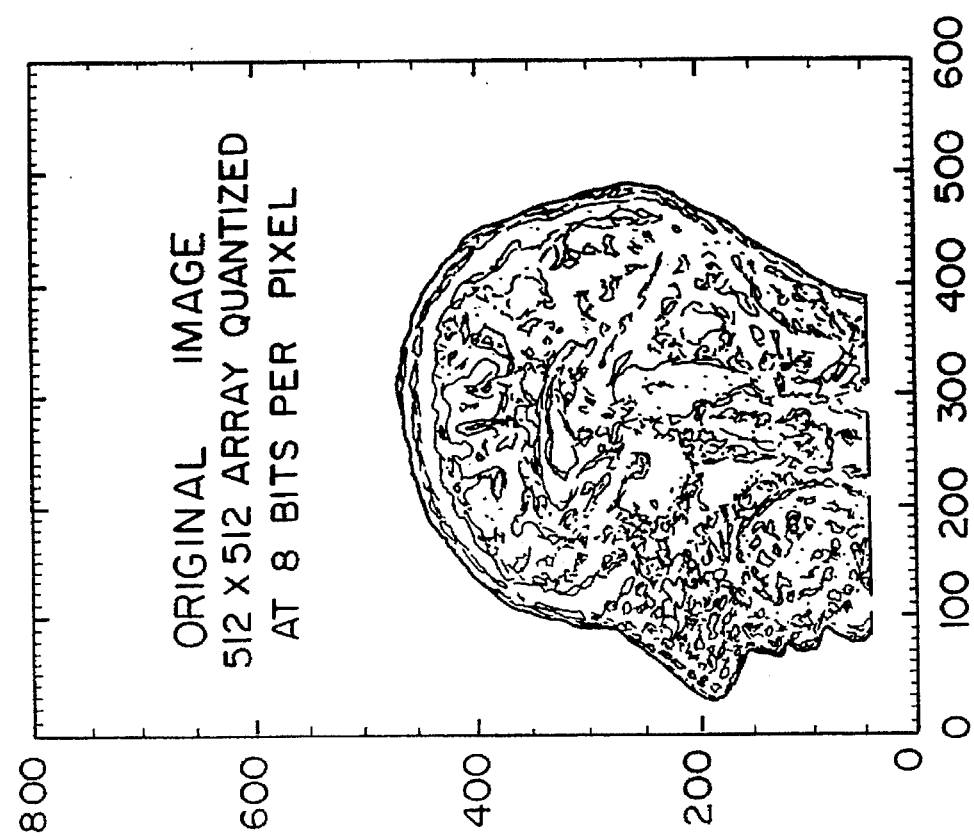
FIG. 3 shows a contour map representation of an original image.
Figure 6:
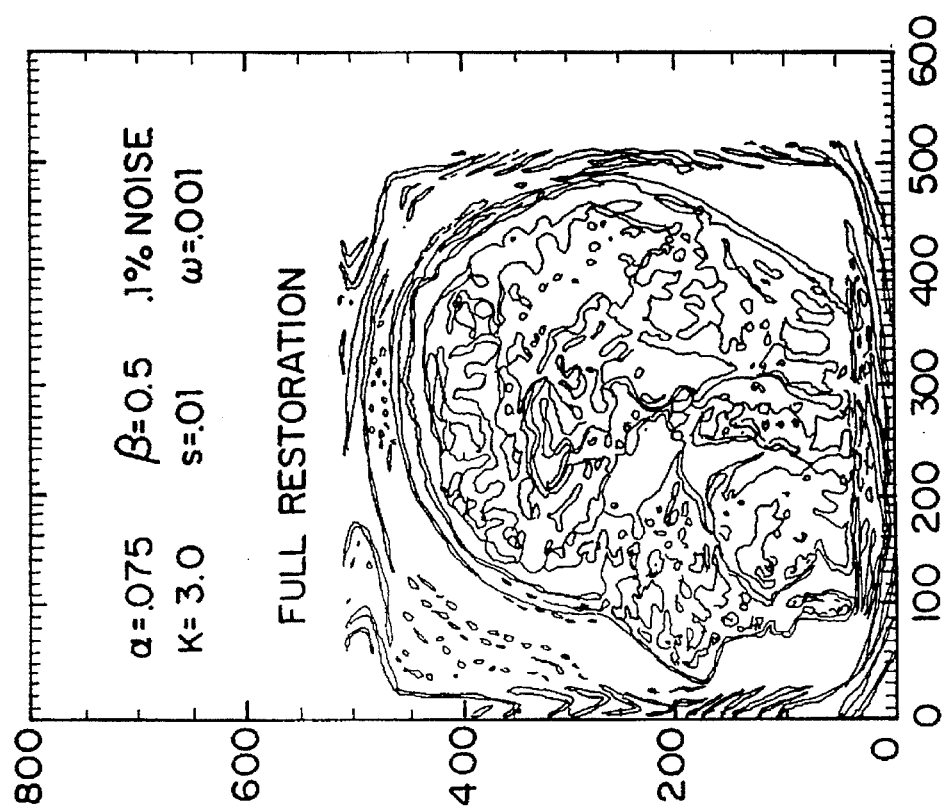
FIG. 6 shows a contour map representation of a restored image generated by applying the restoration method of the present invention to the blurred image of FIG. 4.
Figure 5:
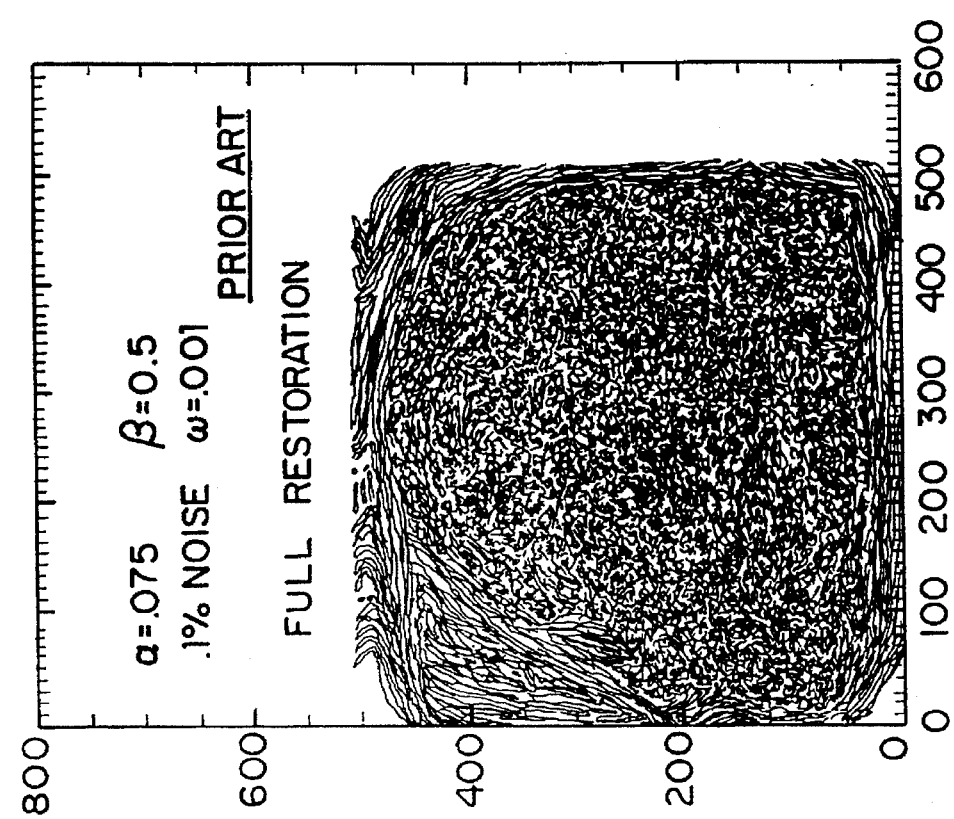
FIG. 5 shows a contour map representation of a restored image generated by applying the prior art Tikhonov restoration method to the blurred image of FIG. 4.

Referring now to FIG. 2, there is shown graphical representation 30 of the constraint in Equation (17). The desired ideal image f(x,y) corresponds to w(x,y,0), the data at time $t=0$ in the partial differential equation problem, Equation (14). This corresponds to line 38 of representation 30. It will be understood that line 38 corresponds to If of Equation (14). The blurred noiseless image $g_e(x,y)=Pf=w(x,y,1)$, is the corresponding solution at time $f=1$ as shown at line 32. At any intermediate time t with $0<t<1$, $w(x,y,t)=P^tf$ is a partial restoration, becoming the full restoration f, as $t \downarrow 0$. An example is shown at line 34 wherein $t=0.7$.

If $g_e(x,y)$ could be used as data at $t=1$ in the time-reversed problem, then for small $s>0$, $w(x,y,s)=P^sf$ would be a good approximation to f, i.e., $\|f-P^sf\|$ would be a small quantity. An example $t=s$ for a small value of s is shown at line 36. In reality, one must use the noise image g(x,y) as data at $t=1$. In that case, high frequency noise amplification in the Tikhonov restoration process causes $w(x,y,s)=P^sf$ to differ appreciably from f. In the present invention, the requirement that $\|f-P^sf\|$ be small is enforced as an explicit additional constraint, in Equation (14). An example with the explicit choice $s=0.01$ is indicated as reference numeral 40 in FIG. 2. This explicit requirement results in greatly reduced noise amplification.

Returning to the original problem, Equation (3), with the optical transfer function given by Equation (5A), a new constrained problem may be formulated. Given $\epsilon, M, K, s > 0$, with $s<1$, find all $f \in L^2(R^2)$ such that $$\|Pf-g\| \leq \epsilon, \quad \|f\| \leq M, \quad \|(I-P^s)f\| \leq K\epsilon \quad \text{Equation (18A)}$$

In an analogy with Tikhonov restoration, a solution to the new constrained problem may be determined by finding that function $f^c(x,y)$ which minimizes the functional of the present invention:

$$\|Pf-g\|^2+(\epsilon/M)^2\|f\|^2+K^{-2}\|f-P^sf\|^2 \text{ over all } f \text{ in } L^2 \quad \text{Equation (18B)}$$

Computational implementation of image restoration method 10 will be understood by those skilled as follows. The essential idea in the implementation of image restoration method 10 is the use of the discrete Fourier transform to mimic the operations described above in the continuous Fourier transform domain. These computations are fast because of the use of the fast fourier transform to implement discrete Fourier transform operations. The close connection between the continuous and discrete Fourier transforms, under appropriate conditions, is taught in detail in E. O. Brigham, *The Fast Fourier Transform*, Prentice-Hall, Inc., Englewood Cliffs, N.J., (1974).

Method 10 of the present invention may be performed upon the degraded image $g(x_j,y_k)$ expressed as a digitized N×N array, where N is a power of 2, and where j,k are integers with $0 \leq j, k \leq N=1$. With 1 the width of the image, let $\Delta x=\Delta y=1/N$ be the sampling interval, so that $x_j=j\Delta x, y_k=k\Delta y$. The actual image transformed by image restoration method 10 is assumed to be surrounded by a border of zeroes of sufficient width to eliminate wrap-around errors in discrete convolutions. The N×N array includes the actual image and its border. The optical transfer function for the imaging process is assumed given by Equation (5A) with known $\lambda_i$ and $\beta_i$. Likewise, the positive constants $\epsilon$, M, K, and s in Equation (18A) are assumed to be known on the basis of a a priori information.

Referring again to FIG. 1, reference is made to the identifying numerals of the representation of image restoration method 10 of the present invention. As shown in centering block 12 of image restoration method 10, the first step is to center the origin in the frequency array. This may be done by forming:

$$g(x_j, y_k)=(-1)^{j+k}g(x_j, y_k), \quad 0 \leq j, k \leq N-1$$

In forward transform block 14 a forward two-dimensional fast Fourier transform is performed upon $g(x_j,y_k)$ as determined in centering block 12. The fast fourier transform of block 14 may be performed by forming:

$$G(\xi_m, \eta_n)=\Delta x \Delta y \Sigma_{j=0}^{N-1} \Sigma_{k=0}^{N-1} g(x_j, y_k) \exp\{-2\pi i(mj+nk)/N\},$$

where $0 \leq m, n \leq N-1$ and $\xi_m=(m-N/2)/1$, $\eta_n=(n-N/2)/1$, $1=N\Delta x$.

The inventive filter of image restoration method 10 is then constructed in Fourier space as represented by filter construction block 16. This filter is constructed with known $\lambda_i$, $\beta_i$, $\epsilon$, M, K, $s>0$. In order to construct the novel filter of image restoration method 10 let $\omega=\epsilon/M$, $\mu=1/(1+K\omega)$, and let $$p_{mn} = \exp\{-\Sigma_{i=1}^{j}\lambda_i(\xi_m^2+\eta_n^2)^{\beta_i}\}, \text{ for } 0 \leq m, n \leq N-1. \quad \text{Equation (23)}$$

Then form:

$$G(\xi_m, \eta_n) = P^2_{mn}G(\xi_m, \eta_n)/\{P^2_{mn}+\omega^2+K^{-2}|1-P^s_{mn}|^2\} \quad \text{Equation (24)}$$

where $0 \leq m, m \leq N-1$.

In partial restoration block 18 of image restoration method 10, a partial restoration at t, $0 \leq t \leq 1$, is constructed by forming:

$$G(\xi_m, \eta_n) = p_{mn}^{s-1}G(\xi_m, \eta_n),$$

where $0 \leq m, n \leq N-1$.

In inverse transform block 20 an inverse two-dimensional fast Fourier transform is performed upon $G(\xi_m, \eta_n)$ which was constructed in restoration block 18. The inverse transform shown in inverse transform block 20 may be obtained by forming $$f(x_j, y_k, t) = 2^{-2}\Sigma_{m=0}^{N-1}G(\xi_m, \eta_n)\exp(\{2\pi i(mj+nk)/N\},$$

where $0 \leq j, k \leq N-1$.
The centering of centering block 12 is then undone in block 22 of image restoration method 10 by forming $$f(x_j, y_k, t) = (-1)^{j+k}f(x_j, y_k, t),$$

where $0 \leq j, k \leq N-1$. Execution of image restoration method 10 may then return to partial restoration block 18 for any other desired value of t.

The result of performing the operations of block 22 is a partial restoration of an image according to image restoration method 10 at the preselected value of t. The user of image restoration method 10 may dispense with partial restoration and proceed directly to full restoration by setting t=0 when restoration block 18 is executed.

The scaling of the fast Fourier transforms in blocks 14, 20 was chosen so as to correspond to continuous Fourier transform operations in a manner well known to those skilled in the art. However, the factor $\Delta x\Delta y$ may be omitted from the forward transform block 14 provided $1^{-2}$ is replaced with $N^{-2}$ in reverse transform block 20. It is straightforward to modify the procedure so as to handle rectangular $N_1 \times N_2$ images; see e.g., R. C. Gonzalez and P. Wintz, *Digital Signal Processing*, Second Edition, Addison-Wesley, Reading, Mass. (1987).

The system of method 10 may be implemented with tentative values of some of the parameters $\lambda_i$, $\beta_i$, $\epsilon$, M, K, s. Image restoration method 10 may be repeated with adjusted values. A sequence of partial restorations as t↓0 is a useful option in that context because noise and ringing usually increase as t↓0. Thus, by performing the restoration in 'slow-motion,' an experienced user may more easily determine the influence of various parameter values and more quickly arrive at corrected values. Tikhonov restoration is obtained by setting s=0 in filter construction block 16.

To implement Method 10, it is not necessary to know the optical system's point spread function p(x,y), or its optical transfer function $\hat{p}(\epsilon,\eta)$, in analytical form. Thus, when the imaging system's point spread function p(x,y) is obtained experimentally as a digitized array $p(x_j,y_k)$, one may use the discrete Fourier transform to create the digitized optical transfer array $P_{mn}$, for use in Equations (23) and (24). In certain cases, method 10 can be implemented even if the system's optical transfer function is not of the form expressed by Equation 5A.

A good starting value for the ratio $\omega=\epsilon/M$ in method 10 can be obtained using "L-curve analysis" as taught in P. C. Hansen, *Analysis of discrete ill-posed problems by means of the L-curve*, SIAM Review, Volume 34, (1992), pp. 561–580.

To locate a good starting value for the parameter K in method 10, proceed as follows. First fix s at a small value, such as s=0.01 or s=0.001. Next, observe from the form of the filtering function in Equation (24) that with fixed s, the filter approaches the Tikhonov filter if K becomes too large. On the other hand, if K is made too small, the Equation (24) becomes a very low-pass filter which oversmooths the image and destroys information. One can use these observations to visually find the optimal value of K, by performing several restorations each with a different value of K, keeping s and $\omega$ fixed. Values of K which reproduce the noisy Tikhonov solution are too large. Values of K which oversmooth the image are too low. A range of K values is quickly found which deblur the image while minimizing noise amplification. The optimal value of K can then be located by further trial restorations in that range of values.

Contour plots of light intensity values are helpful in the above interactive search for K values. Such plots complement the information contained in the usual photographic image displays. In particular, the onset of noise is more easily picked up in the contour plots than it is in the photographic images.

Method 10 can be implemented given the digitized array of a point spread function $p(x_j,y_k)$. We do not need to know the point spread function analytically. We also do not need to know the optical transfer function in analytic form. We can always use fast Fourier transform algorithms to convert the digitized print spread function array into a digitized optical transfer function array for input into method 10.

The deblurring experiment discussed in Section 4.3 of the attached manuscript *Overcoming Holder Continuity in Ill-Posed Continuation Problems*, illustrates the preceding developments set forth with respect to image restoration method 10. At the same time, the experiment demonstrates the soundness of the computational implementation. Thus, image restoration method 10 may be reduced to practice as shown, for point spread functions in class G.

It is believed that image restoration method 10 may be advantageously applied in biomedical imaging, night vision systems, undersea imaging, imaging through the atmosphere, remote sensing, high definition television, as well as several other scientific and industrial applications where electron optics and class G point spread functions play a major role. Two key ideas make image restoration method 10 useful as a diagnostic tool in these and other fields. First, the substantial qualitative improvement in the full restoration that results from the additional constraint in Equation (16). Second, the display of the evolution of the restoration as t approaches 0. Together, these factors offer the possibility of greatly improved diagnostic capabilities, and provide a useful addition to current image restoration technology.

It is believed that method 10 is useful in this manner because it is based on mathematical tools which are different from prior art restoration algorithms. In contrast to the input-output linear system theory familiar to researchers with backgrounds in electrical engineering or computer science, and exemplified by Tikhonov restoration or Wiener filtering, method 10 is based upon partial differential equations, semi-group theory, and the mathematics of diffusion phenomena. The two key ideas mentioned in the preceding paragraph stem from this particular mathematical basis.

It will be understood that method 10 may be implemented on a general purpose computer programmed to perform the operations of blocks 12–22. Alternately, method 10 may be performed using dedicated conventional hardware to perform such conventional operations as the transforms of blocks 14, 20. Additionally it will be understood by those skilled in the art that dedicated hardware may be provided, using conventional synthesis and fabrication techniques, for performing other operations within method 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An image restoration method including image sensor wherein image degradation creates a degraded image $g(x,y)$ of the form $Pf=g$, wherein p is an integral operator applied upon an ideal image $f(x,y)$, $w(x,y,0)=P^0 f$ represents the ideal image at time $t=0$ prior to the operation of p upon f, and $w(x,y,1)=Pf=g(x,y)$ represents the degraded image at time $t=1$, the restoration method comprising the steps of:

(a) providing an image system described by said operator p;

(b) transmitting said ideal image $f(x,y)$ through an image blurring and degrading transmission medium of said imaging system to provide said degraded image $g(x,y)$;

(c) receiving said degraded image $g(x,y)$ from said transmission medium by said image sensor;

(d) digitizing said received degraded image by said digitizer for comparison with said ideal image $f(x,y)$;

(e) requiring the magnitude of the difference between the ideal image f and a blurred version of f to be less than a preassigned tolerance value by performing the following steps:

(f) constraining said magnitude of said difference by minimizing $\|f-P^s f\|$ wherein $P^s f$ represents the image at time $t=s$ and s is a substantially small value;

(g) imposing the constraint $\|f-P^s f\| \leq K\epsilon$, where K is a constant and $\epsilon$ is representative of at least one image restoration parameter;

(h) imposing the constraint $\|Pf-g\| \leq \epsilon$, wherein $\epsilon$ is representative of at least one image restoration parameter;

(i) imposing the constraint $\|f\| \leq M$, wherein $M \gg \epsilon$;

(j) determining a restored image $f(x,y)$ which minimizes the quantity $$\{\|Pf-g\|^2 + \|(\epsilon/M)f\|^2 + \|(1/K)(f-P^2 f)\|^2\}$$

in accordance with said selected image;

(k) adjusting said image in accordance with steps (f)–(j) to provide a plurality of adjusted images; and (l) selecting an adjusted image of said plurality of adjusted images.

2. The image restoration method of claim 1, comprising the further step of time modifying said image $f(x,y)$, to provide a time modified representation $w(x,y,t)=P^t f$.

3. The image restoration method of claim 1, wherein a plurality of images $w(x,y,t)=P^t f$ is determined for a corresponding plurality of values of the time t.

4. The image restoration method of claim 3, wherein the values of said restoration parameters are adjusted in accordance with said plurality of images for successively smaller values of time.

5. The image restoration method of claim 1, wherein said restored image $f(x,y)$ is determined through algebraic operations performed in the Fourier transform domain.

6. The image restoration method of claim 1, wherein $\hat{f}(\xi,\eta)$, the Fourier transform of $f(x,y)$ is determined by $$\hat{f}(\xi,\eta) = \{|\hat{p}(\xi,\eta)|^2 + K^{-2}|1-\hat{p}^s(\xi,\eta)|^2 + \omega^2\}^{-1} \hat{p}(\xi,\eta) \hat{g}(\xi,\eta),$$

wherein $\hat{p}(\xi,\eta)$ is an optical transfer function of said system, $\hat{g}(\xi,\eta)$ is the Fourier transform of the degraded image $g(x,y)$, $\epsilon$ is representative of at least one constant, K is a constant, $M \gg \epsilon$, and s is a substantially small value of time.

7. The image restoration method of claim 6, comprising the steps of performing a plurality of restorations using variations of K.

* * * * *